Dec. 7, 1971   J. C. FELTON   3,624,928

DEVICE FOR TEACHING ARITHMETIC

Filed April 15, 1970

INVENTOR
June Cynthia Felton
BY
ATTORNEY

United States Patent Office 3,624,928
Patented Dec. 7, 1971

3,624,928
DEVICE FOR TEACHING ARITHMETIC
June Cynthia Felton, Holmwood, Hadley Green,
Barnet, England
Filed Apr. 15, 1970, Ser. No. 28,726
Claims priority, application Great Britain, Feb. 11, 1970,
6,610/70
Int. Cl. G09b *19/02*
U.S. Cl. 35—31 A
9 Claims

ABSTRACT OF THE DISCLOSURE

A device for teaching arithmetic has separate discs of different diameters mounted on a vertical post and each marked around its periphery with a separate one of the rows or columns of the "multiplication table," the numbers on each disc being arranged at the same angular interval around the disc. One of the discs is marked with the "one-times table," so that when the first numbers on the scales on each disc are in radial alignment the product or quotient of any two numbers within the range of the scales may be obtained. The discs may be removed from the post so that any selected disc may be used for teaching the "table" in that disc, for example the "three-times" table. In addition the discs may be displaced angularly relative to one another on the post so that the numbers in radial alignment provide series of numbers conforming to a particular formula.

---

Figure 1:
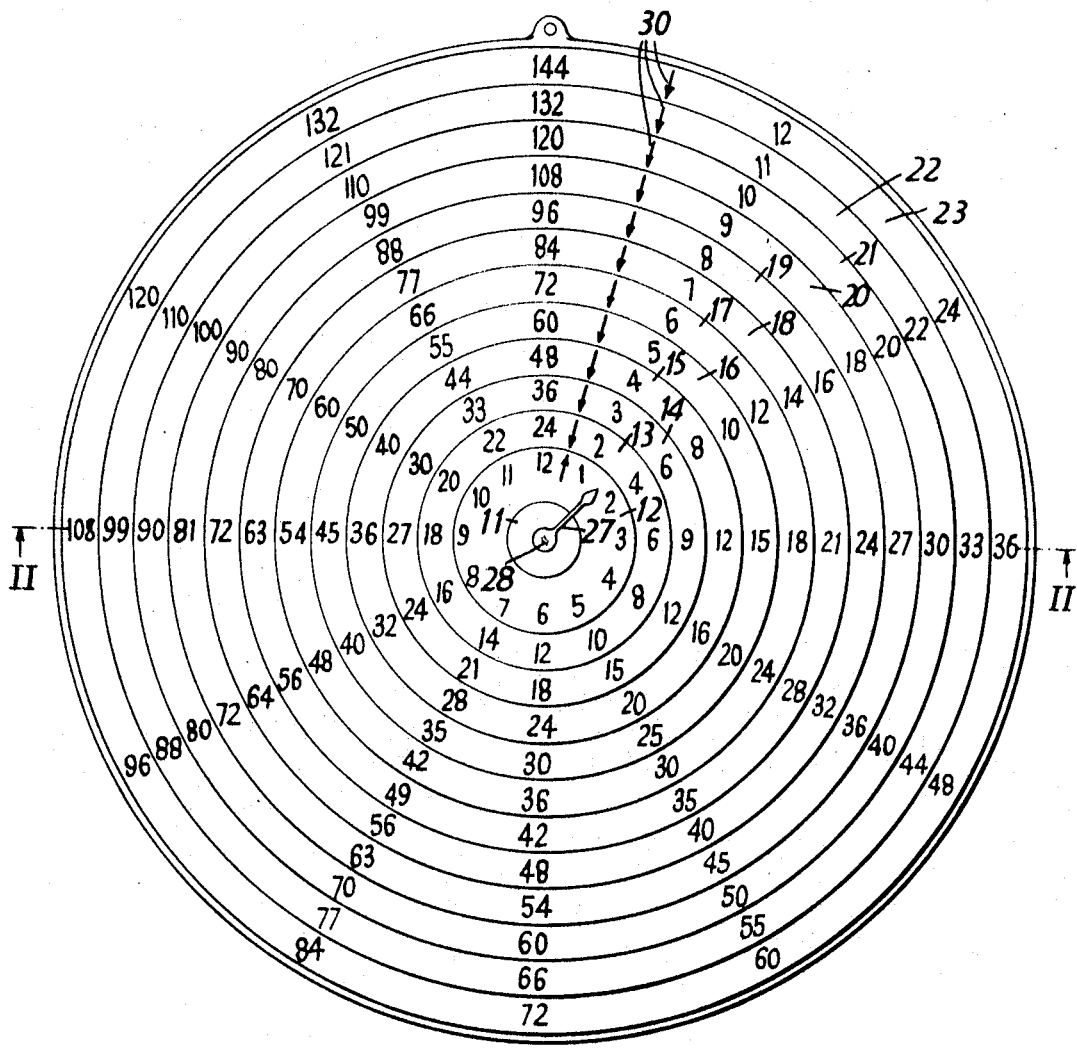

This invention relates to a device for teaching arithmetic.

Arithmetic is generally taught to children with the aid of multiplication tables in which the product of each of the numbers 1–12 with the other numbers are set out in rows and columns, the numbers in each row or column forming an arithmetic progression commencing with the digit corresponding to the difference between successive numbers. Many children however find such tables very confusing due to the multitude of numbers, particularly when being taught the relationship between multiplication, division and ratio of numbers.

The object of the invention is to provide a device which simplifies the teaching of arithmetic.

According to the invention there is provided a device for teaching arithmetic, comprising a plurality of scale members each marked with a scale consisting of a series of numbers to a different order of arithmetic progression commencing with the digit corresponding to the difference between successive numbers in the series, the scales being arranged so that, when the members are juxtaposed to each other with the first numbers in the scales in alignment, successive numbers in the scales are also in alignment, whereby the ratio of any two selected numbers in alignment equals the ratio of any other two numbers in alignment on the same scales as the selected numbers. One of the scales preferably commences with the numeral 1, so that one of the selected numbers may be 1, whereby the product or quotient of any other two numbers within the range of the scales may be obtained.

In the device of the invention each of the scales corresponds to one row or column of the multiplication table hitherto used for teaching arithmetic, and all the scale members except those having scales which for the present are being taught can be removed to avoid confusing a child.

It has been found moreover that the device of the invention is frequently treated by a child as a toy and the removal and replacement of the different members creates interest and amusement, which greatly assists a teacher in holding the attention of the child. In addition the device can be of great assistance in the self-teaching of children having an imperfect knowledge of arithmetic.

The scale members are preferably movable relative to one another to positions in which the first numbers are out of alignment but successive numbers on parts of the scales are in alignment and form numerical series which conform to particular formulae.

The scale members may be bars, rods or blocks which can be placed adjacent each other, but are preferably in the form of circular discs of different diameter superimposed on each other, with the scales marked around the peripheries of the discs. The device can conveniently include a base plate on which the discs are mounted, the plate having a central post and each of the discs having a central aperture through which the post extends as a close sliding fit.

Figure 2:
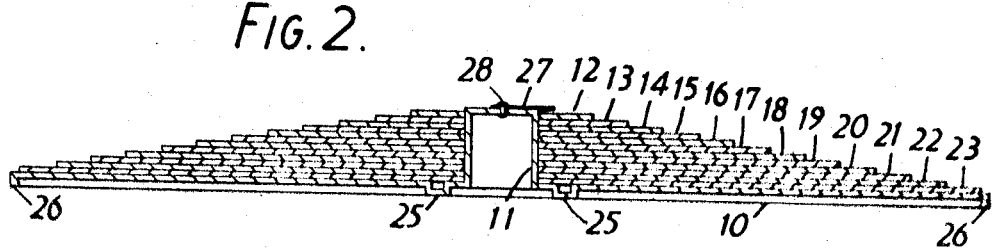

One construction of a teaching device according to the invention will now be described, by way of example, with reference to the accompanying drawing, in which:

FIG. 1 is a plan view of the device, and
FIG. 2 is a sectional elevation view through the line 11—11 in FIG. 1.

Referring to the drawing, the device comprises a base plate 10 having a central post 11, and twelve annular discs 12–23 of different external diameter mounted on the base plate with the post 11 extending as a close sliding fit through the apertures in the centres of the annular discs. The base plate 10 and post 11 are parts of an integral structure vacuum-formed in plastics material, the base plate being formed with a circular channel 25 surrounding the post 11 and with a downwardly projecting peripheral flange 26 forming feet for supporting the device on a flat surface. The discs 12–23, which can conveniently be formed of cardboard, are arranged in order of size with the largest diameter disc 23 adjacent the base plate and the smallest diameter disc 12 at the top of the pile of discs. The post 11 is of a height such that the top of the post is approximately level with the top of the uppermost disc 12. A pointer 27 is rotatably mounted on a spindle 28 which extends vertically upwards from the centre of the post 11. The pointer extends across the inner peripheries of the discs, but is readily removable to permit the discs to be removed from the post.

The uppermost disc 12, is marked with a scale corresponding to the face of a clock, that is with the numbers 1–12 arranged in numerically increasing order in a clockwise direction around the periphery of the disc, the numbers being spaced at 30° intervals around the center of the disc. The peripheral margin of the second uppermost disc 13, that is the part of the disc not concealed by the disc 12, is marked with a scale consisting of a series of twelve numbers commencing with the number 2 and progressively increasing in a clockwise direction in arithmetic progression by the value two. The other discs are similarly provided on their peripheral margins with scales consisting of a series of twelve numbers to a different order of arithmetic progression commencing with the number corresponding to the difference between successive numbers in the series, the first numbers of the scales increasing progressively with increase in the diameter of the discs. Thus the peripheral margin of the lowermost disc 23 has a scale consisting of a series of twelve numbers commencing with the number 12 and progressively increasing in clockwise direction in arithmetic progression by the value twelve.

The discs are arranged so that the first number in each scale lies along a radial line through the number 1 on the scale of the uppermost disc 12. Successive numbers on each scale thus lie along radial lines through the corresponding numbers on the scale on the uppermost disc 12.

When the discs are arranged on the base plate 10 as described above and as shown in the drawing, the ratio of any two numbers on the scales in radial alignment equals the ratio of any other two numbers in radial alignment on the same scales. Thus, the product of any two selected numbers up to 12 can be obtained by setting the pointer to the first selected number on the scale on the uppermost disc 12, which scale consists of the numbers 1 to 12, identifying the scale which commences with the second selected number, and then reading off the number on that scale in radial alignment with the pointer, which latter number is the product of the two selected numbers.

The discs may however be arranged at different angular settings to provide different series of numbers. For example, each disc may be offset by one number in its scale relative to the adjacent inner disc so that the numbers in radial alignment with the number 1 are 1, 4, 9, 16, 25 etc. . . . which correspond to 1, $2^2$, $3^2$, $4^2$, $5^2$ . . . etc.

In order to facilitate the lining up of the discs relative to one another, each disc is preferably provided with an arrow 30 which is aligned with the arrows 30 on the other discs when the discs are arranged with the first number on each scale on a common radial line. Each disc is also preferably provided with radial lines (not shown) drawn on the disc through each number, and also marked on the part of the disc inside the scale with the first number of the scale. Thus a disc marked with the number 5 has a scale reading 5, 10, 15, 20, 25 . . . etc. which is the so-called "five times" table.

In teaching a child multiplication with the aid of the device of the present invention, all the discs except the two uppermost discs 12, 13 are preferably removed initially to avoid confusing the child. The "two-times" table may then be taught with the scales on these two discs. The disc 13 is then replaced by the disc 14 in order to teach the "three times" table. All three of these discs may then be mounted on the post for revision of both the "two times" and "three times" tables. Each of the other discs may then be added in turn in order to teach the other multiplication tables. Adjacent discs are preferably of different colours to faciiltate identification of the same scale at different locations around the device. The uppermost disc 12 can conveniently be black, the discs 13, 15, 19 with the two, four and eight times multiplication scales respectively may be coloured red, the discs 14, 17, 20 with the three, six and nine times multiplication scales respectively may be coloured blue, the discs 16, 21 with the five and ten times scales respectively may be coloured yellow, and the discs 18, 22, 23 with the seven, eleven and twelve scales coloured green, orange and purple respectively.

The device may of course be provided with any desired number of discs each marked with a scale to a different order of arithmetic progression as described above. The scale consisting of the numbers 1 to 12 may if desired be marked on the top surface of the post, and the scale to the largest order of arithmetic progression marked on the periphery of the base plate. The scales may of course extend to more or less than twelve figures each.

I claim:
1. A device for teaching arithmetic and for facilitating arithmetical calculations, characterized by:
(A) a plurality of substantially circular scale members;
(B) means mounting said scale members coaxially, in axially superimposed relation to one another, and providing for rotation of said scale members relative to one another about their axis;
(C) each of said scale members having an exposed peripheral portion that extends all around it, said peripheral portions of axially adjacent scale members being adjacent to one another and disposed to be seen simultaneously; and
(D) each of said scale members having a scale of numbers delineated on its said peripheral portion, at circumferentially equispaced intervals therearound,
(1) the scale on each scale member consisting of an arithmetic progression series that commences with the number corresponding to the difference between successive numbers in the series,
(2) each scale member having a different scale than the others, with the commencing numbers of the several scales differing progressively from one to another of the axially adjacent scale members, and
(3) all of the scale members having the same number of numbers, so that the numbers on all of the several scale members can be brought into alignment with one another, by relative rotation of the scale members, for the solution of problems in ratio and proportion, multiplication, exponential functions and the like.

2. A device as claimed in claim 1, wherein one of the scales commences with the numeral 1.

3. The device of claim 1, further characterized by:
(E) said means mounting the scale members providing for ready disassembly of the same.

4. A device as claimed in claim 1, wherein the scale members comprise discs and the scale on each disc extends annularly around the centre of the disc, the scales being spaced at different distances from the centres of the discs and the numbers on each scale being spaced at the same angular interval around the disc so that, when the discs are centered on a common axis with the first digits on the scales in radial alignment, successive numbers in each scale are also in radial alignment relative to said axis and the ratio of any two selected numbers in radial alignment equals the ratio of any other two numbers in radial alignment on the same scales as the selected numbers.

5. A device as claimed in claim 4 including a base plate for the support of the discs, wherein the base plate is provided with a central post and each of the discs is provided with a central aperture through which the post extends as a close sliding fit.

6. A device as claimed in claim 5, wherein the discs are of different diameter and the scales extend around the peripheries of the discs so that all the scales are visible when the discs are superimposed one on another with each disc of smaller diameter than the adjacent underlying disc.

7. A device as claimed in claim 6, including a pointer mounted on the top of the post for rotation about the axis of the post, whereby the pointer can be set in radial alignment with numbers on the scales.

8. A device as claimed in claim 7, wherein the uppermost disc is marked with a scale consisting of the numbers 1–12 arranged in numerically increasing order in a clockwise direction around the periphery of the disc.

9. A device as claimed in claim 7, wherein the top of the post is marked with a scale consisting of the numbers 1–12 arranged in numerically increasing order in a clockwise direction around the periphery of the top of the post.

References Cited

UNITED STATES PATENTS

| | | | |
|---|---|---|---|
| 331,264 | 11/1885 | Tucker | 235—88 |
| 865,808 | 9/1907 | Stump | 235—78 |

FOREIGN PATENTS

| | | | |
|---|---|---|---|
| 758,251 | 10/1956 | Great Britain | 35—31 A |
| 77,494 | 10/1894 | Germany | 35—31 R |

Wm. H. GRIEB, Primary Examiner

U.S. Cl. X.R.

35—74; 235—88